UNITED STATES PATENT OFFICE.

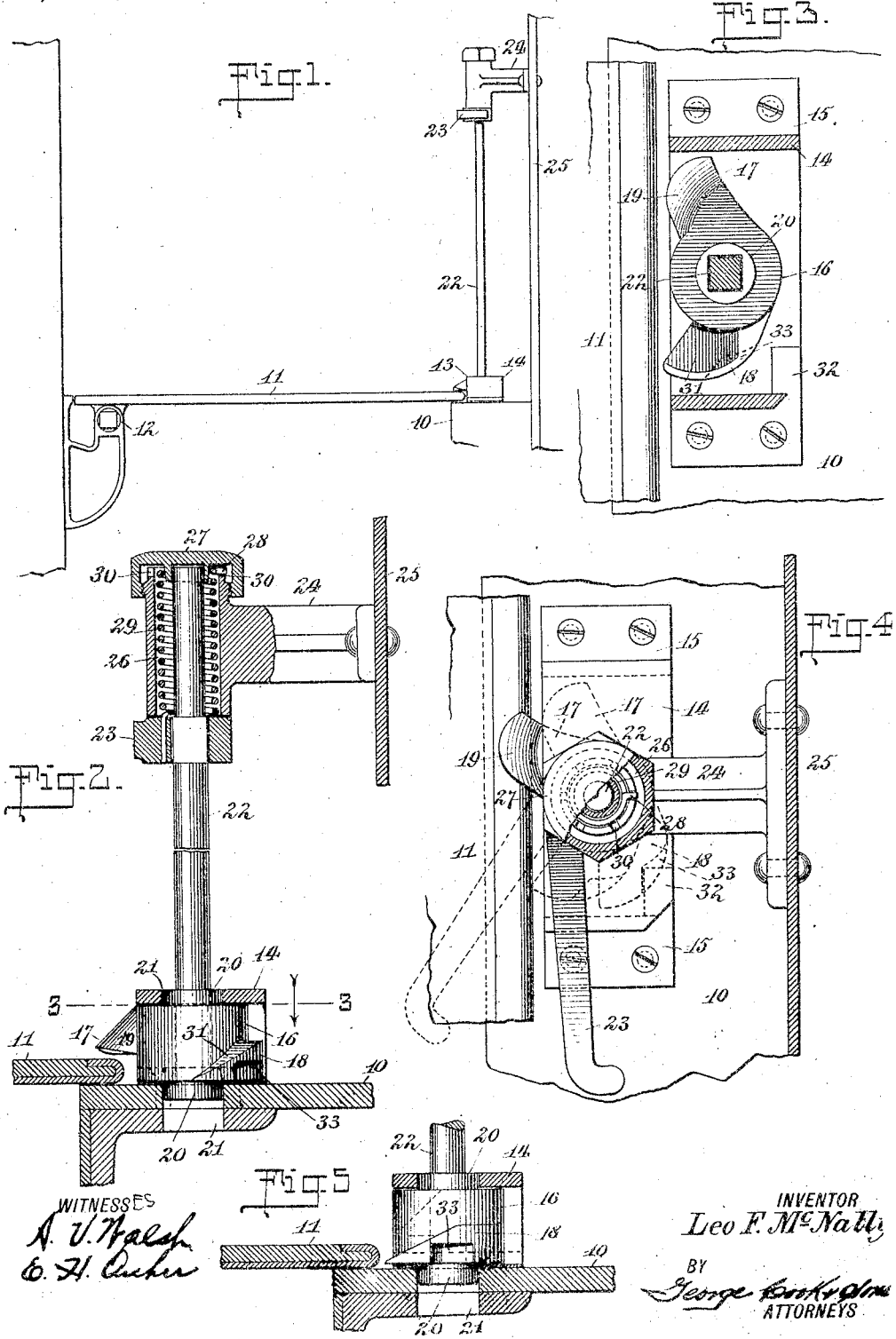

LEO F. McNALLY, OF BROOKLYN, NEW YORK, ASSIGNOR TO DAVID W. PYE, OF RED BANK, NEW JERSEY.

TRAP-DOOR LOCK.

1,210,661. Specification of Letters Patent. Patented Jan. 2, 1917.

Application filed November 7, 1916. Serial No. 129,924.

*To all whom it may concern:*

Be it known that I, LEO F. McNALLY, a citizen of the United States, and a resident of New York, borough of Brooklyn, in the county of Kings and State of New York, have made and invented certain new and useful Improvements in Trap-Door Locks, of which the following is a specification.

My invention relates to a lock, and particularly to one which is adapted for use in connection with trap doors of vestibule cars.

An object of the present invention is to provide a trap door lock which is simple in construction and characterized by an entire absence of gears, interengaging cams, sliding and wearing parts, etc., so that the lock is capable of long and extended service.

A further object is to provide a lock which, although of simple construction, is adapted to positively lock a trap door in its closed position, and when operated, releases the door and unseats the same, so as to dislodge it from its locked position.

A further object is to provide a lock wherein the locking detent or bolt, and the unseating member, are either formed as one piece, or so connected together as to define a unitary structure, mounted for rotation about an axis at right angles to the plane of the door when the latter is in its closed position, so that an elongated shaft, with a handle at the upper end, may be provided and directly connected to the rotating part of the lock, the entire structure being of the simplest design, and the handle in such position as to be readily accessible by the person in charge, or others desiring to use the platform.

Other objects and advantages will further appear, it being understood that changes in the precise embodiment of the invention can be made within the scope of what is claimed without departing from the spirit thereof.

In the drawings, the preferred embodiment of my invention is illustrated, wherein:

Figure 1 is a view in side elevation of a trap door and adjacent portions of a car platform equipped with my improved trap door lock; Fig. 2 is a detail view in side elevation, and partially in section, of my improved trap door lock and opener, illustrating the trap door in its closed position, and so held by the locking detent or bolt; Fig. 3 is a view in horizontal section taken on the line 3—3 of Fig. 2; Fig. 4 is a view in top plan of my improved trap door lock, illustrating by dotted lines the manner in which the lock operates; Fig. 5 is a detail view in side section, similar to Fig. 2, disclosing the manner in which the unseating member forcibly raises and unseats the trap door from its closed position.

Referring specifically to the several views, the platform 10 of a vestibule car is provided with the usual type of trap door 11, the latter being hinged on its one edge, as at 12, the hinge preferably including some form of spring arrangement whereby the trap door will be forcibly raised after it has been released from its locked position and the initial dislodgment accomplished by my improved lock 13.

My improved lock 13 includes a housing or casing 14, which is secured to the car platform 10 by the base plate 15. The base plate 15 may be countersunk in the upper surface of the car platform 10, should it be so desired, but for the purpose of clearness, I have illustrated it as being secured upon the upper surface thereof. Rotatably mounted within the casing 14, is the drum 16, formed integral with which, and projecting radially therefrom, are the locking detent or bolt 17 and the unseating wedge member 18. The locking member 17 and the unseating member 18 are disposed in different vertical planes, as well as being placed one in front of the other. The casing 14 is located adjacent the edge of the platform, and the rotative locking member 17 arranged, and normally held, in the path of movement of the trap door. The rotative locking member or bolt is preferably of spiral or eccentric form, having the beveled face 19 so formed that as the door 11 is forcibly brought into contact therewith, the locking bolt and accompanying parts will be forcibly rotated to one side, allowing the door to pass therebeneath.

The drum 16 is mounted for rotation about an axis at right angles to the plane of the door 11 when the latter is in its closed position, by small projecting hubs 20 carried by the drum and journaled in suitable openings 21 formed in the upper and lower walls of the casing. The exact manner in which the drum is mounted can, however, be changed if desired. An actuating shaft 22 extends through the upper wall of the casing and is rigidly secured to the rotative portion 16 of the lock, and extends upward and receives the operating handle 23 thereon. The handle is thus located in easy access of the person desiring to unlock and dislodge the trap door from its closed position. A bracket 24 is secured to the wall or other support 25, and is provided with an opening 26 extending therethrough, in which the upper extremity of the actuating shaft 22 is contained. A cap 27 is mounted upon the upper extremity of the bracket, and is adapted to hold the offset end 28 of a coil spring 29 in one of the several notches 30, which are provided in the upper extremity of the bracket. The remote extremity of the spring extends down through the bracket and engages the handle 23, which, being rigidly secured to the actuating shaft 22, resiliently holds the lock in position with the rotative locking bolt or member 17 in the path of movement of the door. The several notches which are provided in the upper extremity of the bracket, provide for an adjustment of the tension of the spring.

The unseating member 18 is provided with a wedge-shaped face 31, the lower extremity of which is adapted to pass beneath the trap door 11 and between the same and the adjacent portion of the car platform 10. The unseating member is so spaced with relation to the locking bolt or member 17, that as the handle 23 is turned and the locking bolt moved from above the trap door, and the latter accordingly released, the unseating member will engage the lower surface of the door at or about the time the locking bolt passes from above the upper surface of the door. The further actuation of the handle causes the unseating member to rotate beneath the trap door and dislodge the same from its closed position, thus causing the forced initial upward movement of the door, which movement may be continued by the spring hinge 12, or manually, as the case may be. The lower edges of the locking bolt and the unseating member are arranged in vertical planes, equal to, or slightly greater than, the thickness of the edge of the trap door with which they coöperate, so that the unlocking or releasing of the door and the dislodgment thereof take place in rapid succession as the handle 23 is actuated.

A lug 32 is carried by the casing 14 and projects in the path of movement of the unseating member 18, and so limits the movement of the rotative member in one direction, with the locking member 17 projecting in the path of movement of the trap door, as illustrated in Fig. 4. The unseating member 18 is provided with a notch 33 which receives the said lug therein, thus providing a positive abutment and stop for the rotative member. The entire absence of wearing parts and inter-engaging cams or gears ordinarily associated with a lock containing a locking bolt and unseating member, not only renders the present lock subject to economical manufacture, but insures its long and efficient service.

What I claim is:

1. A trap door lock consisting of a rotative part, with the axis thereof extending substantially at right angles to the plane of the door when the latter is in its closed position, a locking member, and an unseating member carried by said rotative part, arranged in different vertical planes and lying in different quadrants.

2. A trap door lock comprising a rotative bolt, and an unseating member rigid one with respect to the other, means rotatively mounting said locking and unseating members, said unseating member adapted to forcibly dislodge the door from its closed position after releasement from said locking member.

3. A lock of the character described comprising a casing, a locking member and a wedge member arranged in different planes and extending one in front of the other, said locking and unseating members formed as a unitary structure, and rotatively mounted within said casing, a shaft connected to said locking and unseating members and adapted to actuate the same, and a handle carried by said shaft.

4. A trap door lock comprising a rotative part with the axis thereof substantially at right angles to the plane of the door when the latter is in its closed position, said rotative part including locking and unseating members with beveled faces lying in different planes and spaced one in front of the other, and a shaft with a handle thereon engaging said rotative part, for the forced actuation thereof.

5. A trap door lock comprising a rotative part with the axis thereof substantially at right angles to the plane of the door when the latter is in its closed position, said rotative part including locking and unseating members with beveled faces lying in different planes and spaced one in front of the other, a shaft with a handle thereon engaging said rotative part for the forced actuation thereof, and resilient means engaging said shaft and adapted to normally hold the said locking member in the path of movement of the said door.

6. A trap door lock comprising a casing or housing, adapted to be secured to the platform of a car, a rotative part including a locking member and an unseating member formed as a unitary structure arranged in different planes and occupying different quadrants, said rotative part mounted within said casing or housing, and adapted to rotate about an axis at right angles to the plane of the platform, the unseating member adapted to pass between the lower surface of the door and adjacent portions of the supporting structure therefor, as the said locking member rotates to one side of, and releases, the said door, and means for manually rotating said rotative part.

7. A trap door lock comprising a casing or housing, adapted to be secured to the platform of a car, a rotative part including a locking member and an unseating member formed as a unitary structure arranged in different planes and occupying different quadrants, said rotative part mounted within said casing or housing, and adapted to rotate about an axis at right angles to the plane of the platform, the unseating member adapted to pass between the lower surface of the door and adjacent portions of the supporting structure therefor, as the said locking member rotates to one side of, and releases, the said door, means for manually rotating said rotative part, said means including a shaft with a handle thereon, and a spring tending to rotate said shaft in one direction.

8. A trap door lock comprising a rotative part including beveled locking and unseating members formed as a unitary structure and arranged in different vertical planes and occupying different quadrants, said rotative part adapted to rotate about an axis substantially at right angles to the trap door when the same is in its closed position, a shaft engaging said rotative part, a bracket for the support of the upper extremity of said shaft, a handle secured to said shaft for the forced actuation thereof, a resilient member contained within said bracket, engaging the same and the said shaft, adapted to normally hold the locking member of the rotative part in the path of movement of the said trap door, and means for adjusting the tension of said resilient member.

Signed at New York, borough of Manhattan, in the county of New York and State of New York, this 6th day of November, A. D. 1916.

LEO F. McNALLY.

Witnesses:
A. M. LINDENSTRUTH,
W. J. ELLIOTT.